Patented Mar. 18, 1930

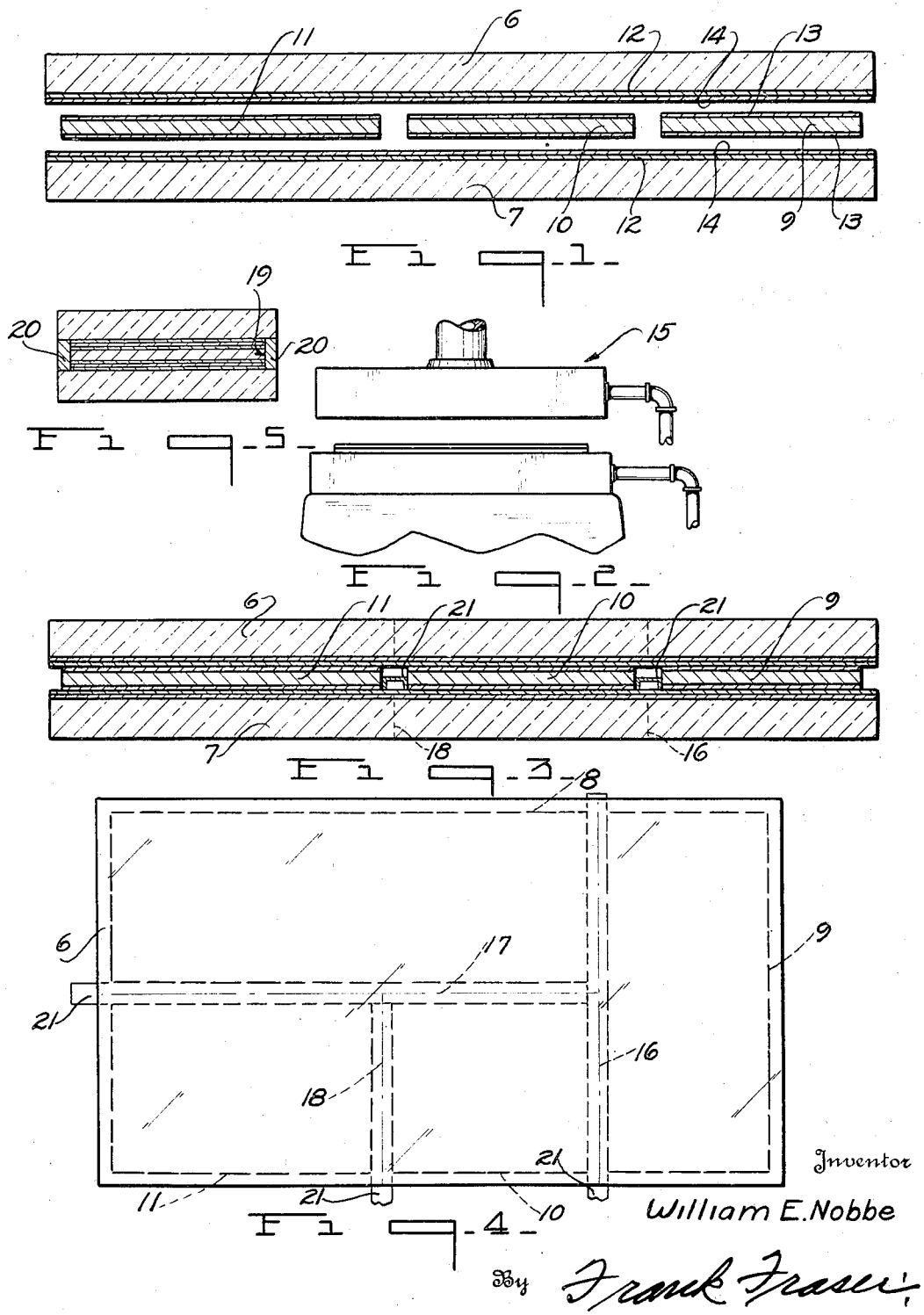

1,751,052

UNITED STATES PATENT OFFICE

WILLIAM E. NOBBE, OF TOLEDO, OHIO, ASSIGNOR TO LIBBEY-OWENS GLASS COMPANY, OF TOLEDO, OHIO, A CORPORATION OF OHIO

METHOD FOR MAKING LAMINATED GLASS

Application filed February 2, 1928. Serial No. 251,283.

The present invention relates to composite sheets of glass and more especially to an improved method for making the same.

An important object of the invention is to provide an improved method for producing composite or laminated sheets of glass which will greatly simplify, speed up or otherwise facilitate the manufacture thereof.

Another object of the invention is the provision of an improved method for producing laminated glass, the practice of which will render possible the cutting of a relatively large composite sheet into a plurality of relatively smaller individual composite sheets in a more efficient and practical manner than heretofore.

Another object is to provide such a method for making laminated glass wherein a plurality of relatively small individual sheets are preferably simultaneously produced in the form of a single relatively large composite sheet or unitary structure, the large single composite sheet being then cut up to provide a plurality of relatively smaller individual composite sheets.

A further object is to provide such a method of the herein described character, wherein a plurality of relatively small individual sheets of non-brittle material are interposed between preferably two large sheets of glass and arranged side by side, the glass sheets and sheets of non-brittle material being then united, and the glass sheets subsequently cut between the adjacent sheets of non-brittle material.

A still further object is to provide such a method of the herein described nature wherein the individual sheets of non-brittle material interposed between the sheets of glass are so arranged with respect to one another and also with respect to the edges of the glass sheets that after the laminations have been united and the sandwich cut in the manner to be hereinafter specified, the edges of the several individual composite sheets may be luted or sealed without the necessity for further cutting or trimming.

Still another object is the provision of such a method of the herein described nature wherein the individual sheets of non-brittle material are arranged between the sheets of glass with their adjacent edges in spaced relation, the glass sheets being then united with the sheets of non-brittle material simultaneously while the said sheets of non-brittle material are effectively maintained spaced from one another during such uniting preferably by positive mechanical means.

Other objects and advantages of the invention will become more apparent during the course of the following description when taken in connection with the accompanying drawings.

In the drawings forming a part of this application and wherein like numerals are employed to designate like parts throughout the same, Fig. 1 is a transverse section showing the arrangement of the sheets of glass and sheets of non-brittle material prior to the uniting thereof, Fig. 2 is a diagrammatic view of one type of press which may be used to unite the several laminations, Fig. 3 is a view similar to Fig. 1 but showing the sheets united, Fig. 4 is a top plan view of Fig. 3, and Fig. 5 is a section showing one of the finished smaller composite sheets.

Briefly speaking, in the production of laminated glass in accordance with the present invention, a plurality of individual sheets of non-brittle material are interposed between preferably two relatively larger sheets of glass, the said individual sheets of non-brittle material being arranged side by side with their adjacent edges preferably in spaced substantially parallel relation. The glass sheets are then adapted to be united with the several individual sheets of non-brittle material simultaneously to form a large composite sheet or unitary structure after which the glass sheets are cut between the adjacent sheets of non-brittle material so as to produce a plurality of individual composite sheets. The individual sheets of non-brittle material are so arranged with respect to one another and also with respect to the edges of the glass sheets that after the laminations have been united and the sandwich cut in the manner to be hereinafter specified, the edges of the several individual composite sheets may be sealed or luted without the necessity for further cutting or trimming. Prior to the uniting of the several sheets however, the adjacent surfaces of the glass sheets and sheets of non-brittle material are preferably coated with a suitable bonding material to aid in the uniting of the several laminations.

In the drawings the numerals 6 and 7 designate two relatively large sheets of glass between which are adapted to be interposed a plurality of relatively smaller individual sheets of non-brittle material. While any suitable number and size of non-brittle sheets may be used, four have been herein shown by way of illustration and are designated 8, 9, 10 and 11 respectively. Each sheet of glass 6 and 7 preferably carries thereon a coating or skin 12 applied thereto in any desired manner while the opposite surfaces of the non-brittle sheets of material are covered with a similar skin 13 and which skins cooperate to assist in uniting the glass sheets and sheets of non-brittle material. To aid in acquiring a good bond, a film 14 of some suitable solution may be arranged between the skins 12 and 13.

It is of course to be understood that the proportions of the skins and films shown in the above drawings are not accurate since both the skins and films are, in actual practice, very thin. The thickness has, however, been shown as greatly exaggerated for the purpose of illustration. Also, the several sheets may be united by any suitable bonding material applied thereto in any suitable manner. For instance, the skins may be omitted if desired and only a film of bonding material used, or vice versa.

In the practice of the present improved method, the individual sheets of non-brittle material are first arranged side by side between the two larger sheets of glass. The said sheets of non-brittle material are arranged with their outer edges positioned slightly inwardly from the edges of the glass sheets and their adjacent edges are adapted to be in spaced, substantially parallel relation. The adjacent edges of the adjoining sheets of non-brittle material are spaced from one another preferably a distance substantially twice the distance which the outer edges thereof are spaced inwardly from the edges of the glass sheets. After the sheets are arranged in this manner and the surfaces thereof covered with the bonding material to be used, the said sheets may be placed within a suitable press such as shown by way of example in Fig. 2 and designated in its entirety by the numeral 15, the several laminations being united preferably under the combined action of heat and pressure.

After the several laminations have been properly united, it will be apparent that there is provided a single large composite sheet such as shown in Fig. 3. The glass sheets 6 and 7 are then adapted to be cut between the adjacent sheets of non-brittle material so as to produce a plurality of relatively smaller composite sheets. More specifically, the glass sheets are adapted to be cut along lines equal distances from the adjacent edges of adjoining sheets of non-brittle material or in other words along the lines 16, 17 and 18. Since the adjacent sheets of non-brittle material are spaced from one another a distance substantially twice the distance from which their outer edges are spaced from the edges of the glass sheets, it will be apparent that after the cutting of the glass sheets in the above manner and along the lines specified, each cut or individual composite sheet, one of which is shown in Fig. 5, will be formed with a peripheral groove or recess 19 of equal depth throughout. Paraphrasing the above, the glass sheets will be cut slightly larger than the sheets of non-brittle material so that the groove or recess 19 will extend entirely around the edge of the cut sheet between the opposed sheets of glass. This recess or groove is then adapted to be luted or filled with a suitable sealing material 20 for the purpose of protecting the inner lamination or sheet of non-brittle material and the bond between the inner lamination and glass sheets from the atmosphere, etc.

In order to maintain the several individual sheets of non-brittle material spaced from one another and also to assist in preventing slippage thereof during the uniting of the several laminations, a plurality of spacer bars or the like 21 may be utilized, one of these bars being inserted between the adjacent edges of adjoining sheets of non-brittle material as shown in Figs. 3 and 4. These bars are not of such a height that they will interfere with the proper uniting of the several laminations, but they will maintain the sheets of non-brittle material spaced from one another during the uniting operation.

It is well known that it has heretofore been customary to produce laminated glass to size due to the difficulty encountered in and the impracticability of cutting the same. Consequently, it has heretofore been feasible to produce only a single sheet at a time. By practicing the improved method herein provided, however, it is possible to produce a plurality of composite sheets simultaneously, these sheets being made initially in the form of a large single sheet which may, due to the novel arrangement of the sheets of non-brittle material be subsequently cut up into a plurality of relatively smaller composite sheets. This can be easily and quickly accomplished since it is not necessary to cut through the sheets of non-brittle material. Also, in view of the novel arrangement of the sheets of non-brittle material between the sheets of glass, the edges of the individual composite sheets may be luted or sealed after the cutting operation without the necessity of further trimming or cutting. Moreover, the number of cuts necessary to be made in order to properly divide the single large sheet into the plurality of smaller sheets is reduced to a minimum and it is believed that the advantages to be derived from the present invention will be readily apparent to those skilled in the art.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of making laminated glass, which consists in interposing a plurality of individual sheets of non-brittle material between two relatively larger sheets of glass, arranging the said sheets of non-brittle material side by side with their edges in spaced relation, uniting the glass sheets with the individual sheets of non-brittle material simultaneously, and in then cutting the glass sheets intermediate the adjacent edges of the sheets of non-brittle material whereby each individual cut sheet will have a peripheral groove or recess.

2. The method of making laminated glass, which consists in interposing a plurality of individual sheets of non-brittle material between two relatively larger sheets of glass, arranging the said sheets of non-brittle material edge to edge in spaced substantially parallel relation, uniting the glass sheets with the individual sheets of non-brittle material simultaneously, and in then cutting the glass sheets slightly larger than the sheets of non-brittle material to form a continuous recess or groove in the edge of each individual cut sheet between the two sheets of glass.

3. The method of making laminated glass, which consists in interposing a plurality of individual sheets of non-brittle material side by side between two relatively larger sheets of glass, arranging the sheets of non-brittle material edge to edge in spaced relation and also spaced from the edges of the glass sheets, uniting the glass sheets with the individual sheets of non-brittle material simultaneously, and in then cutting the glass sheets intermediate the adjacent edges of the adjoining sheets of non-brittle material.

4. The method of making laminated glass, which consists in interposing a plurality of individual sheets of non-brittle material side by side between two relatively larger sheets of glass, arranging the sheets of non-brittle material with their outer edges positioned inwardly from the edges of the glass sheets and their adjacent edges spaced from one another a distance substantially twice the distance which the outer edges thereof are from the edges of the glass sheets, uniting the glass sheets with the individual sheets of non-brittle material simultaneously, and in then cutting the glass sheets along lines equal distances from the adjacent edges of adjoining sheets of non-brittle material to form each individual cut sheet with a continuous peripheral groove of equal depth throughout.

5. The method of making laminated glass, which consists in interposing a plurality of individual sheets of non-brittle material side by side between two relatively larger sheets of glass, uniting the glass sheets with the individual sheets of non-brittle material simultaneously while concurrently maintaining the individual sheets of non-brittle material spaced from one another by a positive means, and in then cutting the glass sheets between adjacent sheets of non-brittle material.

6. The method of making laminated glass, which consists in interposing a plurality of individual sheets of non-brittle material between two relatively larger sheets of glass, arranging the said sheets of non-brittle material side by side with their edges in spaced relation, uniting the glass sheets with the individual sheets of non-brittle material simultaneously while concurrently maintaining the individual sheets of non-brittle material in spaced relation by positive means during the uniting thereof with the glass sheets, and in then cutting the glass sheets intermediate the adjacent edges of the sheets of non-brittle material whereby each individual cut sheet will be provided with a peripheral groove or recess.

7. The method of making laminated glass, which consists in interposing a plurality of individual sheets of non-brittle material between two relatively larger sheets of glass, arranging the said sheets of non-brittle material edge to edge in spaced substantially parallel relation, uniting the glass sheets with the individual sheets of non-brittle material simultaneously while concurrently maintaining the individual sheets of non-brittle material spaced from one another by positive means, and in then cutting the glass sheets slightly larger than the sheets of non-brittle material to form a continuous recess or groove in the edge of each individual cut sheet between the two sheets of glass.

8. The method of making laminated glass, which consists in interposing a plurality of individual sheets of non-brittle material side by side between two relatively larger sheets of glass, arranging the sheets of non-brittle material with their outer edges positioned inwardly from the edges of the glass sheets and their adjacent edges spaced from one another a distance substantially twice the distance which the outer edges thereof are from the edges of the glass sheets, uniting the glass sheets with the individual sheets of non-brittle material simultaneously while concurrently maintaining the individual sheets of non-brittle material spaced from one another by positive mechanical means, and in then cutting the glass sheets along lines equal distances from the adjacent edges of adjoining sheets of non-brittle material to form each individual cut sheet with a continuous peripheral groove of equal depth throughout.

Signed at Toledo, in the county of Lucas and State of Ohio, this 30th day of January, 1928.

WILLIAM E. NOBBE.